United States Patent [19]

Shibazaki

[11] Patent Number: 5,010,496

[45] Date of Patent: Apr. 23, 1991

[54] DOCUMENT PROCESSING SYSTEM

[75] Inventor: Nobuo Shibazaki, Yokohama, Japan

[73] Assignee: Canon Kabushiki Kaisha, Tokyo, Japan

[21] Appl. No.: 365,719

[22] Filed: Jun. 14, 1989

[30] Foreign Application Priority Data

Jun. 17, 1988 [JP] Japan .................................. 63-148222

[51] Int. Cl.⁵ ............................................ G06K 15/00
[52] U.S. Cl. ...................................... 364/519; 364/900
[58] Field of Search ............................ 364/518–523, 364/930 MS, 235 MS, 236 MS, 225.8 MS; 400/6, 63, 695–697

[56] References Cited

U.S. PATENT DOCUMENTS

4,480,931 11/1984 Kamikura et al. ..................... 400/63

Primary Examiner—Arthur Evans
Attorney, Agent, or Firm—Fitzpatrick, Cella, Harper & Scinto

[57] ABSTRACT

There is provided a document processing system having an erasing device to erase the printed characters when a document is made. The system comprises: a memory to store the printed data train such as a word or the like together with end-of word or end-of-line data like a space; an erasure instructing device to instruct to erase the printed data train; and an erasing device to erase the printed data train until the end-of-word or end-of-line data on the basis of an instruction from the erasure instructing device. The printed characters or the like are erased in response to the continuous erasure key input, the erasing operation can be promptly executed and an amount of erasure ribbon to be consumed for the erasure in the printer can be reduced and the erasing speed is improved.

8 Claims, 14 Drawing Sheets

DOCUMENT PROCESSING SYSTEM

BACKGROUND OF THE INVENTION

1. Field of the Invention

The present invention relates to a document processing system and, more particularly, to a document processing system having erasure means for erasing printed characters upon making of a document.

2. Related Background Art

Hitherto, in such a kind of system, when the printed characters are erased, the erasing operation is executed on a character unit basis by the depression of an erasure key by using an erasure ribbon.

However, in the above conventional system, the erasing operation of a printer is started immediately after the erasure key was depressed and the erasing operation is executed every character, so that there is a drawback such that it takes a time to continuously erase the printed characters.

Further, since the erasing operation is executed every character, there is a drawback such that an amount of erasure ribbon which is consumed for erasure is large.

SUMMARY OF THE INVENTION

It is an object of the present invention to eliminate the foregoing drawbacks and to provide a document processing system which can promptly erase printed characters.

In consideration of the above drawbacks, it is another object of the invention to provide a document processing system which can continuously execute the erasing operation in response to an instruction of the continuous erasure and can also stop the erasing operation during the erasure.

In consideration of the above drawbacks, still another object of the invention is to provide a document processing system which can automatically continuously erase the characters until an end of word in response to an instruction of the continuous erasure.

In consideration of the above drawbacks, still another object of the invention is to provide a document processing system which can automatically erase the characters until an end of word in response to an instruction of the continuous erasure and can also continuously erase the characters exceeding the word.

DETAILED DESCRIPTION OF THE DRAWINGS

The present invention will be described in detail hereinbelow with reference to the drawings.

Figure 1:
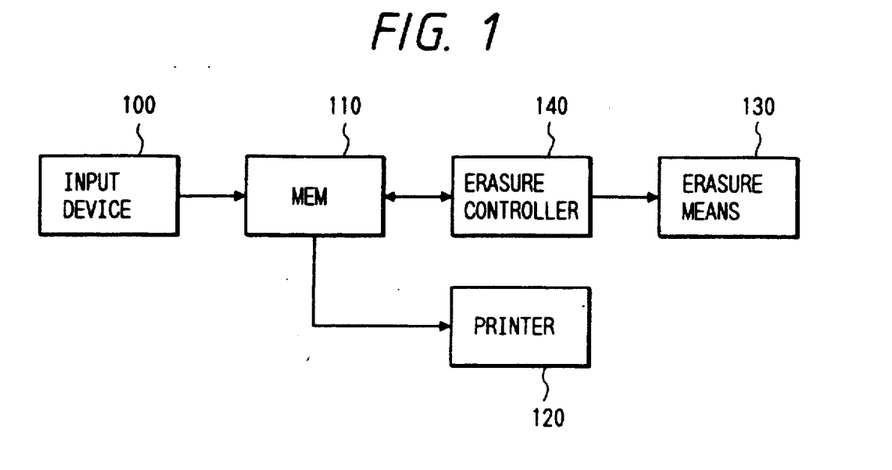
FIG. 1 is a diagram showing a fundamental construction of a document processing system according to the present invention.

As shown in FIG. 1, a document processing system according to the invention comprises: an input device 100 to execute a character input and an erasure input; a memory 110 to store input characters; a printer 120 to print the characters stored in the memory; erasure means 130 to erase the printed characters by the erasure input which was input by the input device 100; and an erasure controller 140 to control the erasure means 130. It will be obviously understood that after completion of the erasing operation, the corresponding characters in the memory are also erased.

EMBODIMENT 1

Continuous erasure in accordance with an erasure counter

Figure 2:
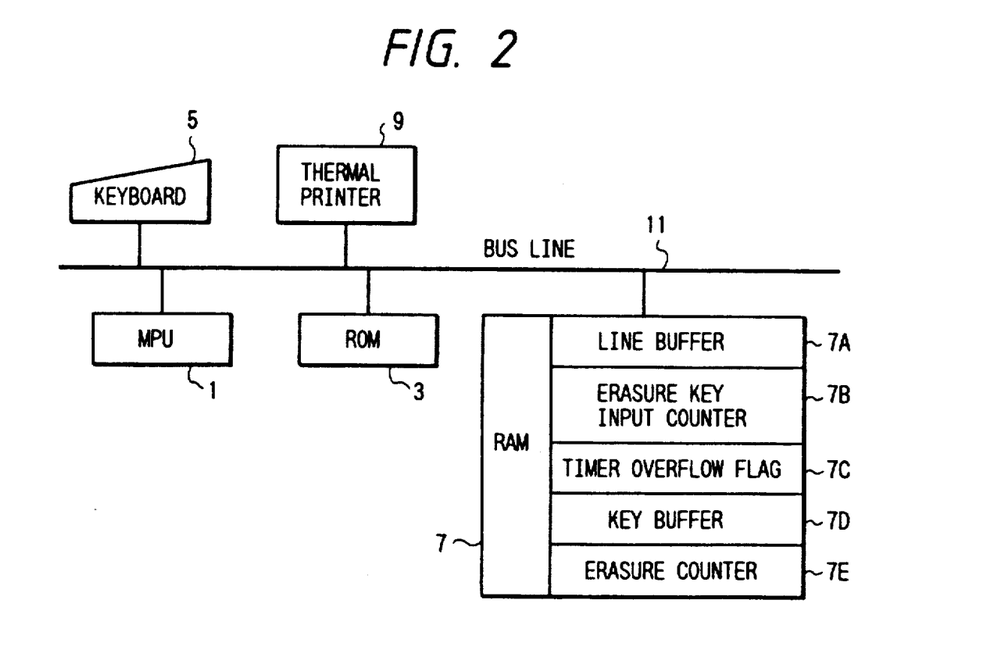
FIG. 2 is a block diagram showing a construction of the embodiment 1 of the invention.

FIG. 2 shows a construction of the embodiment 1 of the invention. Reference numeral 1 denotes an MPU comprising, for instance, a microcomputer. The MPU controls each section of the document processing system in accordance with processing procedures or the like shown in FIGS. 3 and 4. Reference numeral 3 denotes an ROM (read only memory) to store the control programs and control information according to various kinds of control procedures which are executed by the MPU 1 including the processing procedures shown in FIGS. 3 and 4.

Reference numeral 5 denotes a keyboard as an input device to input characters or the like or to input a command for erasure or the like. Reference numeral 7 denotes an RAM (random access memory) to develop document information or the like. The RAM 7 has: an area 7A as a line buffer to store a character string which was input from the keyboard 5, in which the character string also includes a character string which has already been printed; an erasure key input counter 7B to count the number of input times of the erasure key which were executed by the keyboard 5; a timer overflow flag 7C to discriminate whether a continuous input mode has been set or not upon continuous input of the erasure key from the keyboard 5; a key buffer 7D to store key data from the keyboard 5; and an erasure counter 7E to count the number of erasure characters on the basis of the count value of an erasure key input counter in the erasing process. Pitch data and the like have also been stored in the RAM 7.

Reference numeral 9 denotes a (erasable) thermal printer to print a document. The printer is not limited to such a type of printer but may be an impact type printer having a daisy wheel, a ribbon, an erasure ribbon, a hammer, and the like or an ink jet type printer. Reference numeral 11 denotes a bus line to connect each of the above-mentioned sections.

Figure 3A:
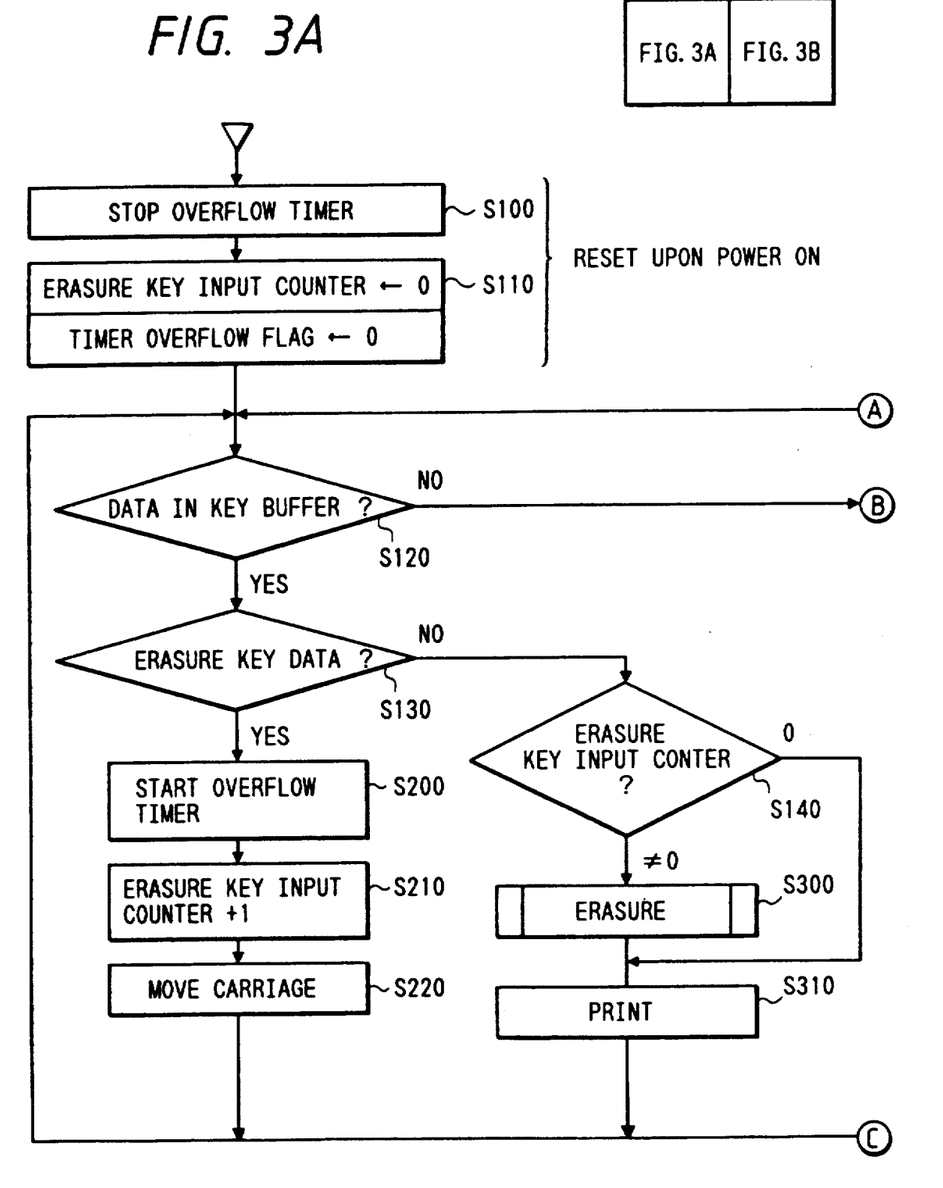
FIGS. 3A to 3B are flowcharts for the embodiment 1 of the invention.
Figure 3B:
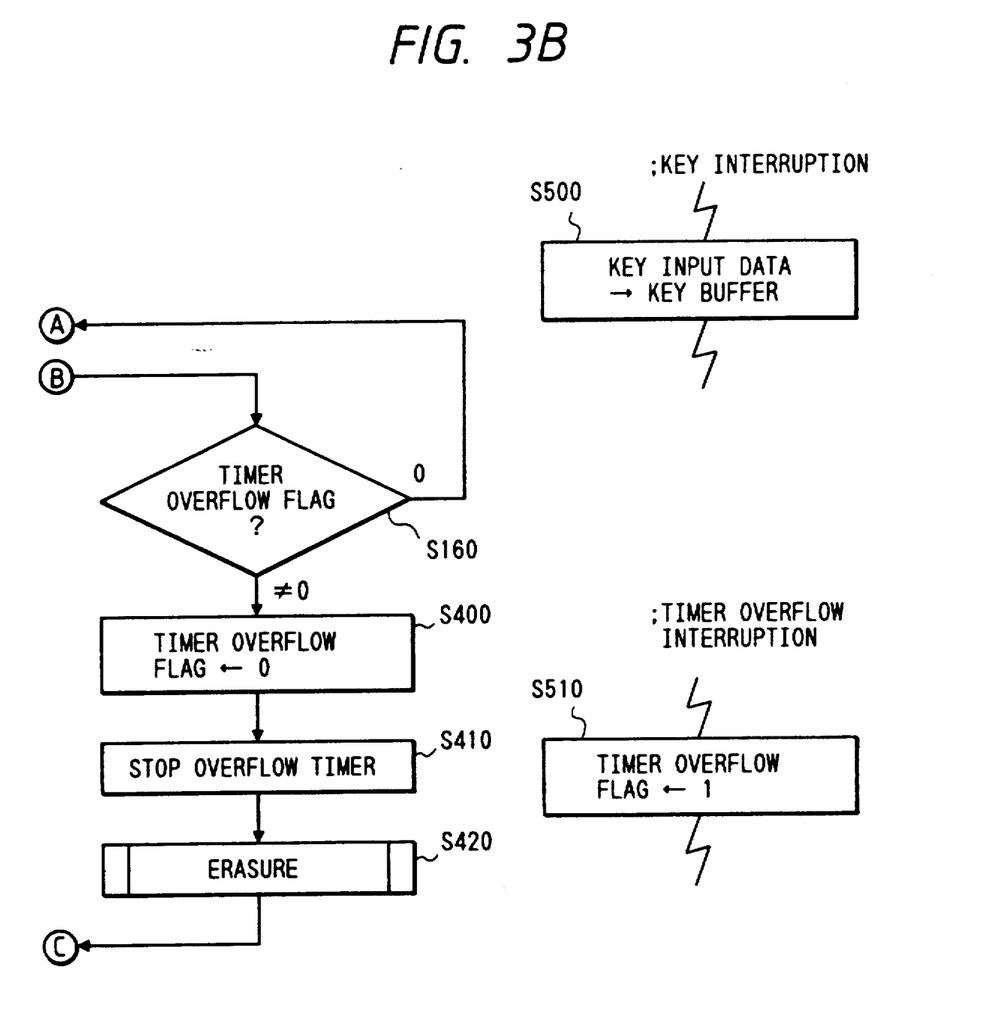

FIG. 3 is a flowchart for the first embodiment of the invention. In the embodiment, the erasing operation is executed when the continuous input of the erasure input key in interrupted.

As initialization of the power ON or the like, first, in step S100, an overflow timer to know an input interval time between the erasure key input and the next erasure key input upon continuous input of the erasure key is stopped. In step S110, the erasure key input counter 7B and timer overflow flag 7C in the RAM 7 are reset to "0", respectively.

When a key is input from the keyboard 5, the key input data is stored into the key buffer 7B in the key interruption in step S500. After completion of the storage of the key input data, step S120 follows. In step S120, if it is determined that data exists in the key buffer, step S130 follows. In step S130, the oldest key input data stored in step S500 is made invalid. The key input data during the processings in step S130 and subsequent steps are sequentially stored in step S500.

Character input

After the character data was stored into the key buffer 7D, step S140 follows if NO in step S130.

If the character input was executed immediately after the input of the erasure key (erasure key input counter ≠0) (that is, the character input before the timer overflow after the erasure key input does not occur) in the discrimination in step S140, the erasing process (which will be explained hereinafter in FIG. 4) is executed in step S300. After completion of the erasing process, the relevant character is printed in step S310.

On the other hand, if the count value of the erasure key input counter is set to "0" in step S140, the processing routine immediately advances to step S310 and the printing process is executed.

Erasure key input

If it is determined in step S120 that data has been input, step S130 follows. In step S130, if the erasure key data has been stored into the key buffer 7D, the processing routine advances from step S130 to step S200.

In step S200, the overflow timer to know the time interval until the next key input is executed is started. At this time, if the overflow timer has already been started, it is once stopped and then started again. For instance, when the erasure key was continuously input twice, if the input time interval from the first erasure key input to the second erasure key input lies within a predetermined time (the time when the timer overflow interruption does not occur) due to the overflow timer, the input operation is regarded as the continuous input operation. After the elapse of the predetermined time, the input operation is not regarded as the continuous input operation.

In the next step S210, the count value of the erasure key input counter is increased by "1". In step S220, a carriage is moved to the corresponding character position in accordance with a character pitch and the system again waits until the next key is input. Then, step S120 follows. The erasure key input can be also regarded as a continuous erasure command by continuously depressing the key or by depressing a repeat key after the erasure key was depressed. The count value of the erasure key input counter can be also properly updated in accordance with the time of the continuous command.

Erasure

If no key is input within a predetermined time (the time when the timer overflow interruption does not occur) after the erasure key input was executed, the processing routine advances from step S120 to step S400 on the basis of the discrimination in step S160.

In step S400, the timer overflow flag which was set to "1" in step S510 is reset to "0". When the erasure key was input, the overflow timer which was started in step S200 is stopped in step S410. Thereafter, step S420 follows and the erasing process (which will be explained hereinafter in FIG. 4) is executed.

Figure 4:
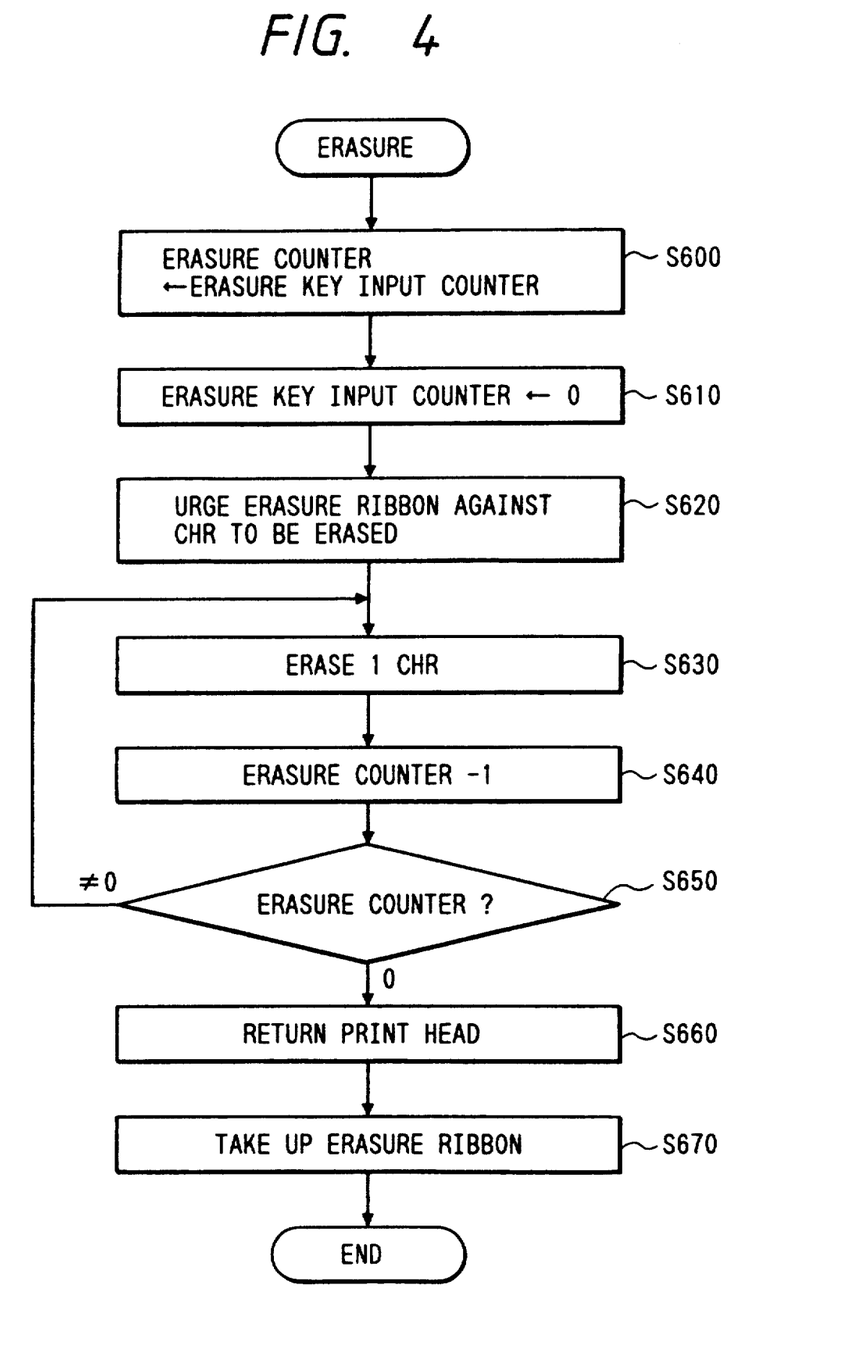
FIG. 4 is a flowchart for the erasing process in the embodiment 1 of the invention.

FIG. 4 shows a flowchart for the erasing process in the embodiment 1 in the invention. First, in step S600, the erasure key input counter which was counted up is shifted to the erasure counter for use in this process by the erasure key input. In the next step S610, the count value of the erasure key input counter is reset to "0" and step S620 then follows.

Erasing operation

In step S620, an erasure ribbon is urged against a character to be erased by a print head or may be come into contact with a character to be erased. In step S630, the erasure ribbon is taken up, the carriage is moved, the print head is heated, and the relevant one character is erased.

After one character was completely erased, the count value of the erasure key input counter is decreased by "1" in step S640. In step S650, by checking the count value of the erasure counter, a check is made to see if any other characters to be erased still exist or not. If YES, the processing routine again advances to step S630.

If there is no character to be erased, step S660 follows and the print head is returned to the original position. In step S670, the erasure ribbon is taken up and the erasing operation is finished. The operation to take up the erasure ribbon can be also executed when the next erasure command is input.

Embodiment 2

Continuous erasure until the end of word

Figure 5:
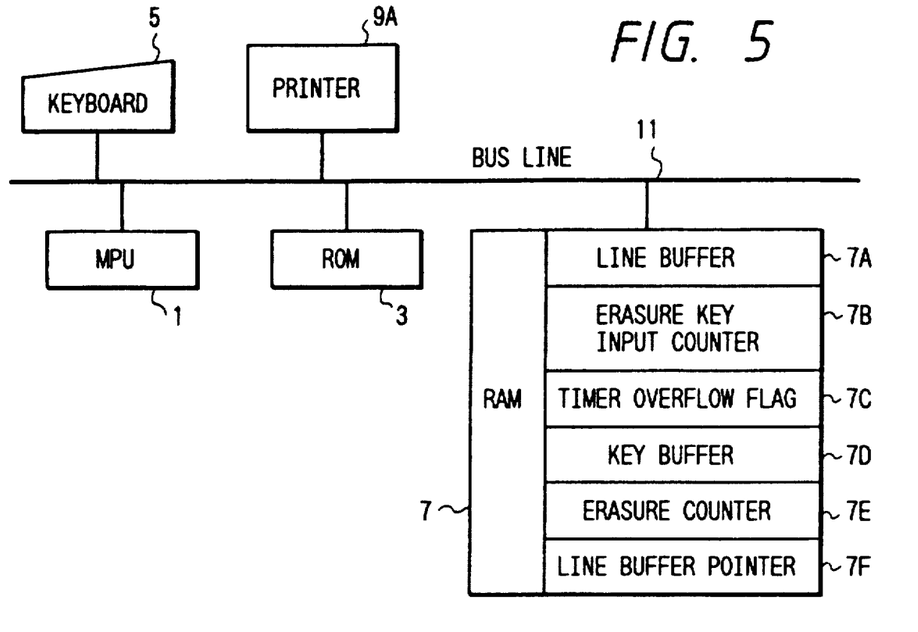
FIG. 5 is a block diagram showing a construction of the embodiment 2 of the invention.

FIG. 5 shows a construction of the embodiment 2 of the invention. In FIG. 5, the same parts and components as those shown in FIG. 2 are designated by the same reference numerals. Reference numeral 7F denotes a line buffer pointer to indicate a location in the line buffer 7A to store end-of-word data such as character, space, or the like which was input from the keyboard 5. Reference numeral 9A denotes a printer such as thermal printer, impact type printer, or the like to print a document.

Figure 6A:
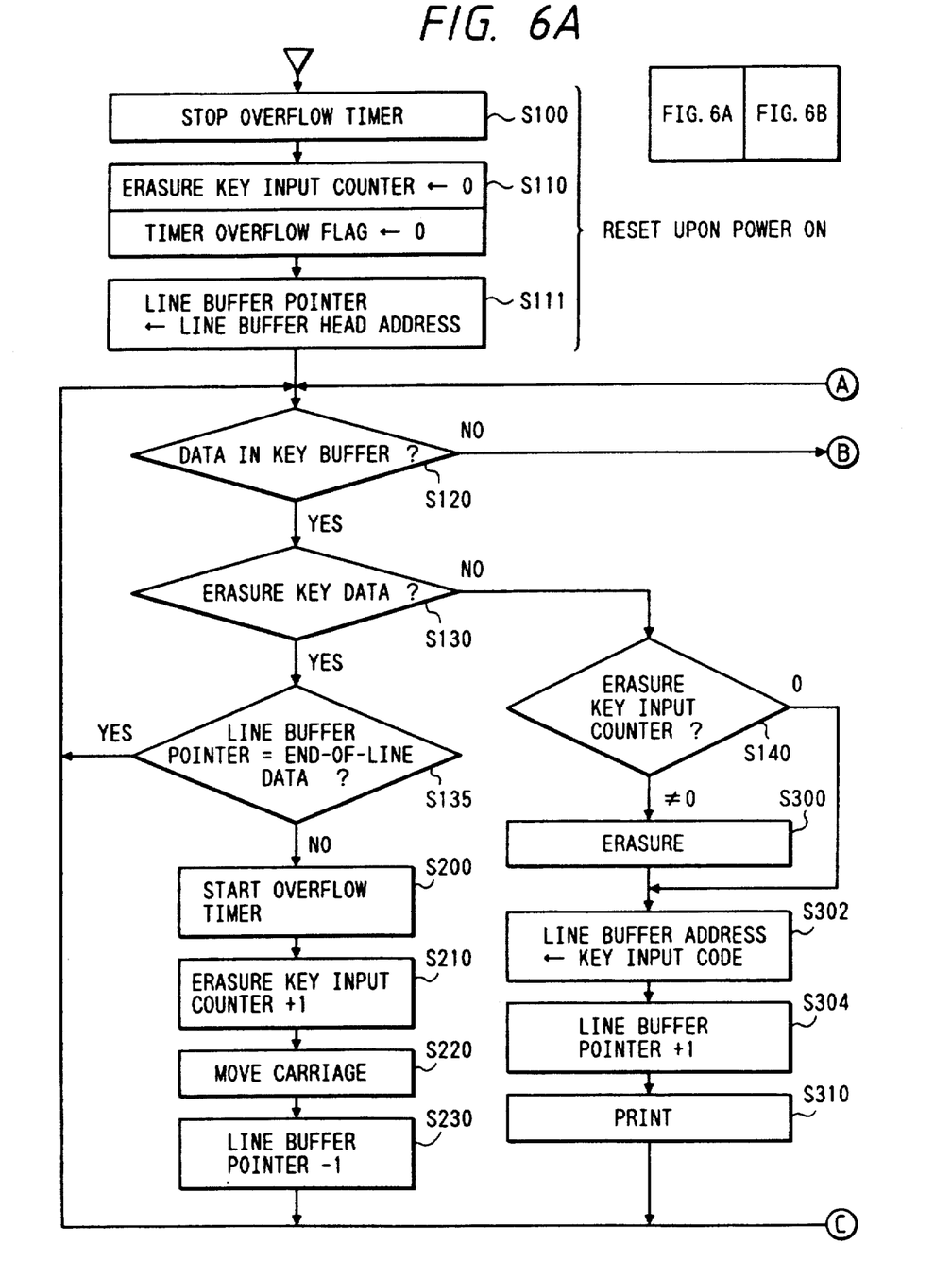
FIGS. 6A & 6B are flowcharts for the embodiment 2 of the invention.
Figure 6B:
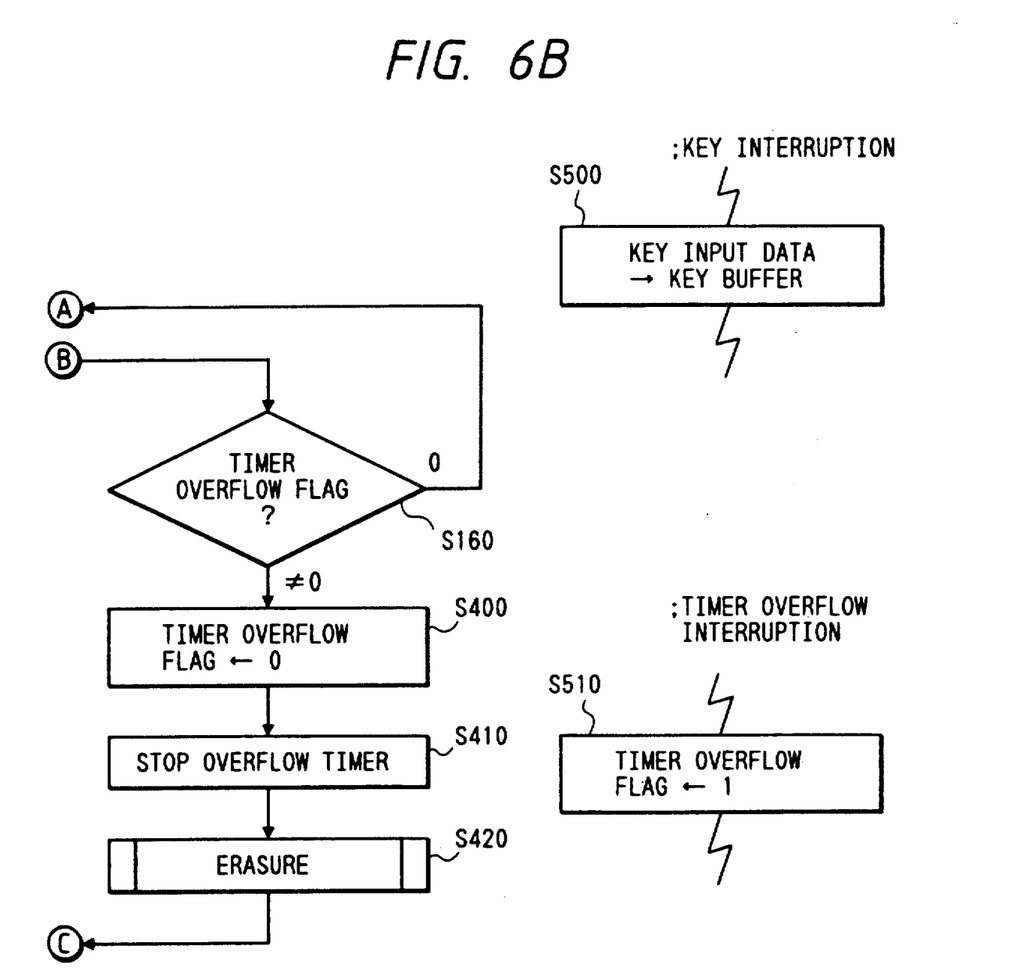

FIG. 6 is a flowchart for the embodiment 2 of the invention. In the embodiment, in response to the continuous input of the erasure key, the erasing operation is executed until the end-of-word data.

The points added to the sections described in the embodiment 1 will now be explained hereinbelow with reference to FIG. 3 mainly with respect to the case of a thermal printer as an example.

As the initialization upon power ON, in step S111, a line buffer pointer to indicate a location to store the end-of-word data such as character, space, or the like which was input from the keyboard 5 is initialized to a head address in the line buffer.

Character input

When the end-of-word data such as character, space, or the like is input from the keyboard 5, the key interruption occurs. In step S500, the key input data is stored into the key buffer 7D.

If the key input data exists in the key buffer 7D, step S130 follows on the basis of the discrimination in step S120. If it is determined in step S130 that the key input data is not the erasure key data, step S140 follows. If the erasing process is needed, step S300 is executed. If the erasing process is unnecessary, step S302 follows.

In step S302, the key input data from the key buffer 7D is converted into the character code and stored into the address indicated by the line buffer pointer 7F. In the next step S304, the line buffer pointer 7F is updated (the next line buffer address is indicated). In step S310, the character corresponding to the character code is printed.

Erasure key input

When the erasure key is input from the keyboard 5, the key interruption occurs. In step S500, the key input data is stored into the key buffer 7D.

If the key input data exists in the key buffer 7D in the discrimination in step S120, step S130 follows. Since it is determined that the key input data is the erasure key data in step S130, the processing routine advances to step S135.

In step S135, if the line buffer pointer 7F indicates the end-of-word data such as space or the like, the processing routine is returned to step S120. (Thus, an erroneous erasure of the preceding word due to the excess input of the erasure key can be prevented.)

In step S135, if the line buffer pointer 7F does not indicate the end-of-word data such as space or the like, step S200 follows and the overflow timer to know the time interval until the next key input is started. At this time, if the overflow timer has already been started, it is once stopped and is again started.

In the next step S210, the count value of the erasure key input counter is increased by "1". In step S220, the carriage is moved to the corresponding character position in accordance with the character pitch. In step S230, the line buffer pointer 7F is returned to the address indicative of the one-preceding character code. The processing routine is returned to step S120 and the system waits for the next key input.

Embodiment 3

Continuous erasure exceeding the end-of-word

Figure 7:
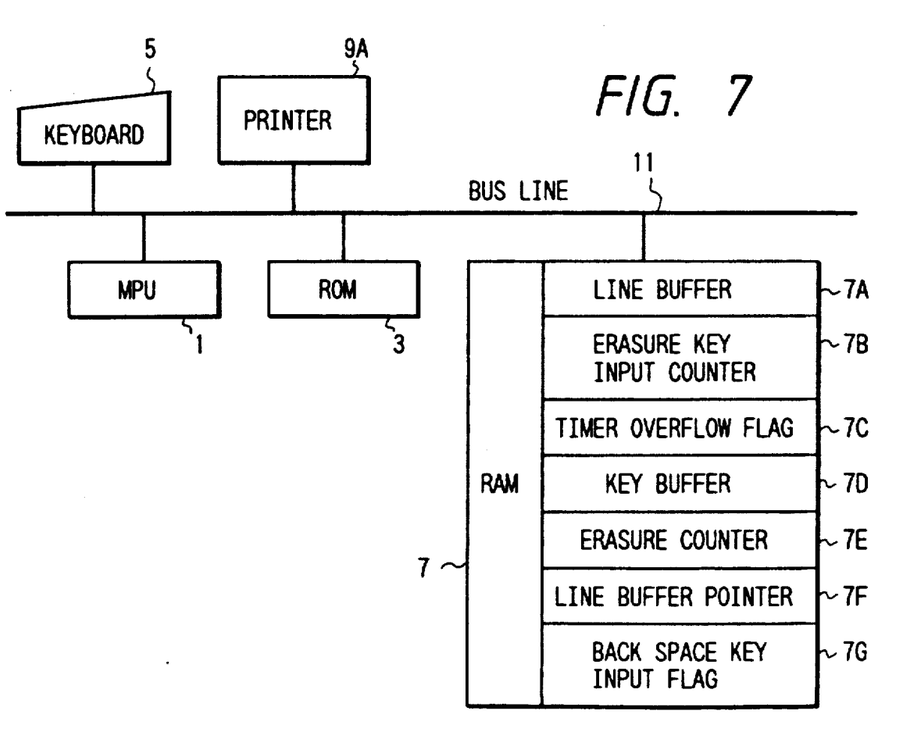
FIG. 7 is a block diagram showing a construction of the embodiment 3 of the invention.

FIG. 7 shows the embodiment 3 of the invention.

The difference between FIG. 7 of the embodiment 3 and FIGS. 5 and 6 which were used to explain the embodiment 2 will now be mainly described hereinbelow.

In FIG. 7, the same parts and components as those shown in FIG. 5 are designated by the same reference numerals.

Reference numeral 7G denotes a back space key input flag which is set to "1" in the case where when the back space key is input, the erasure key has previously been input (the erasure key input counter ≠0) and the line buffer pointer 7F indicates end-of-line data such as space or the like.

Figure 8A:
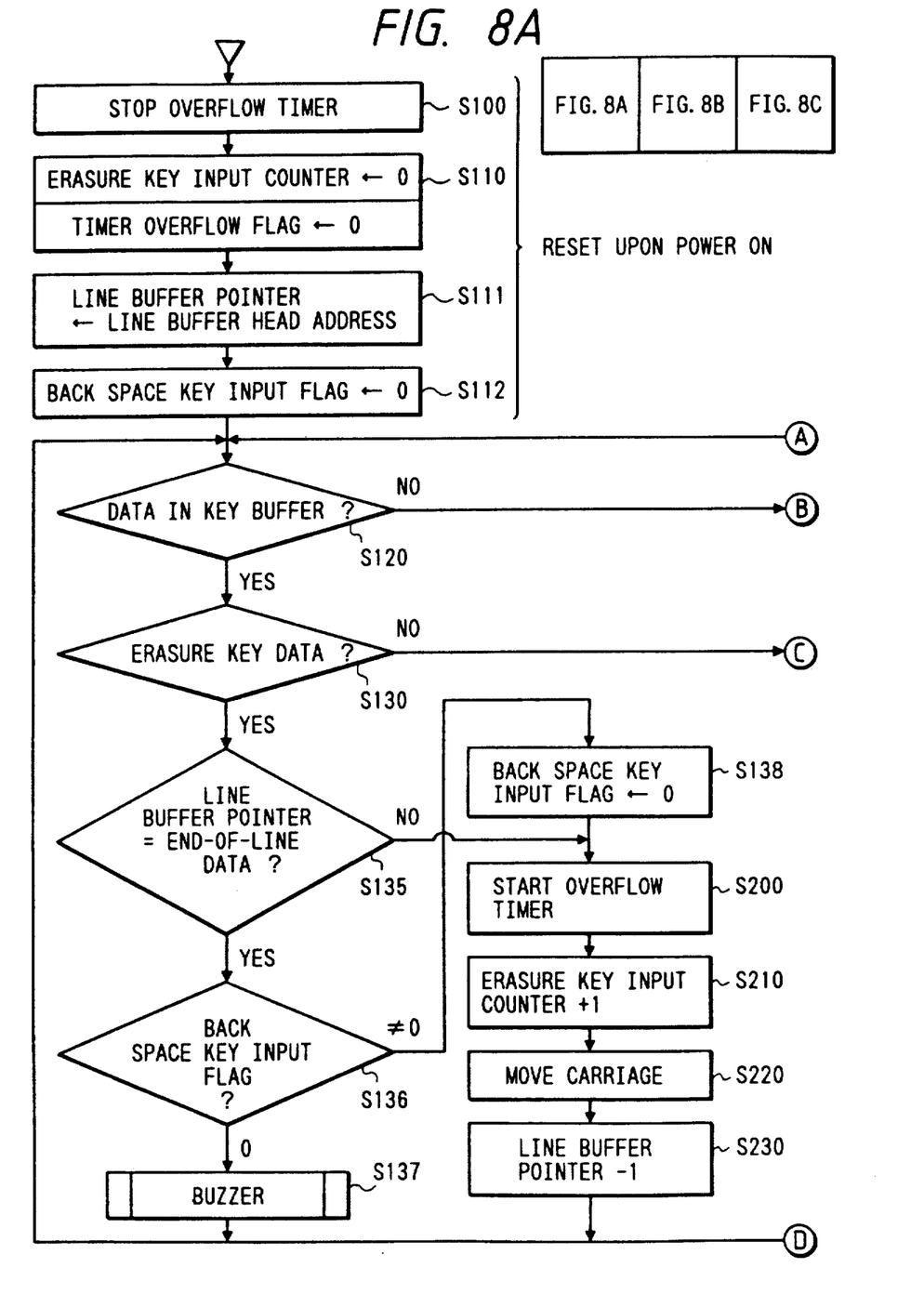
FIGS. 8A–8C are flowcharts for the embodiment 3 of the invention.
Figure 8B:
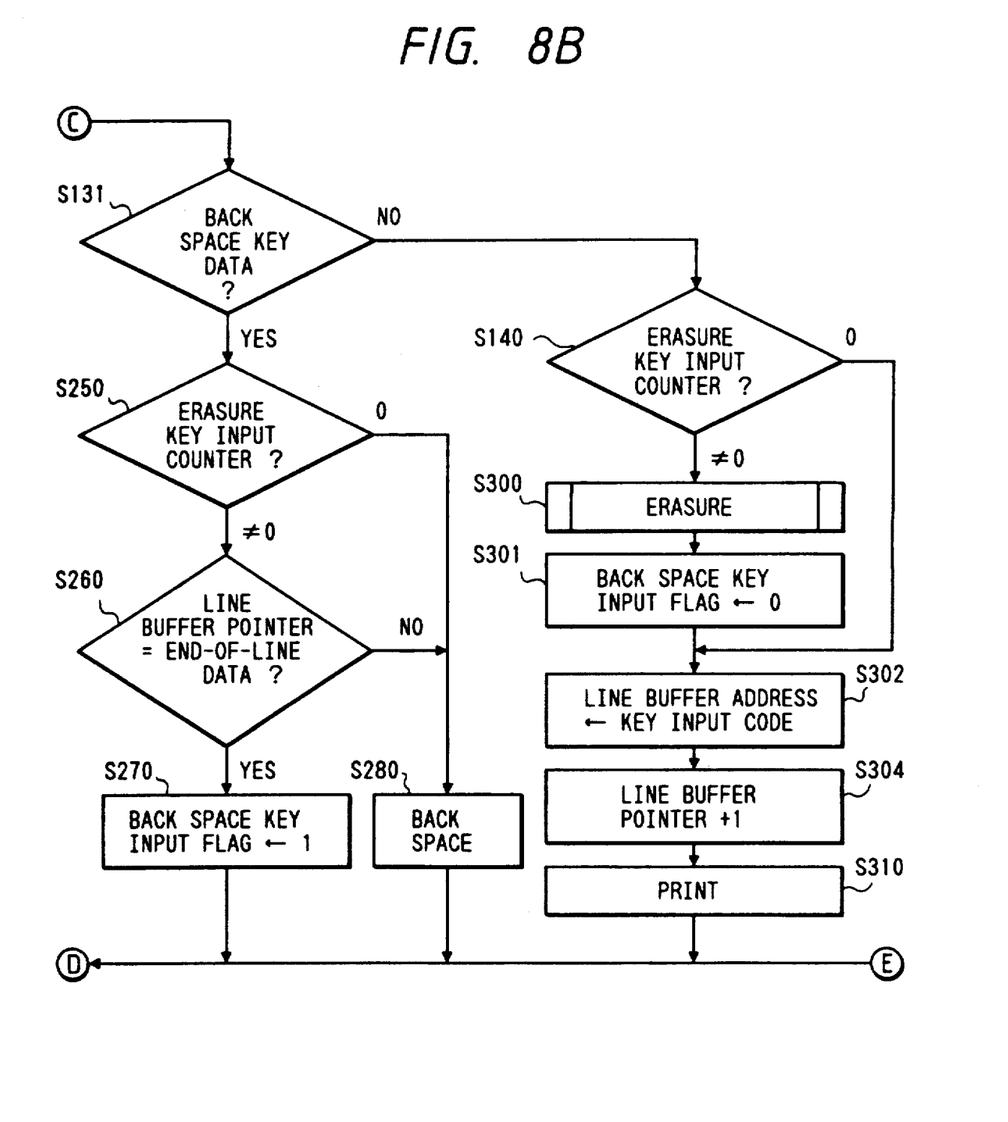
Figure 8C:
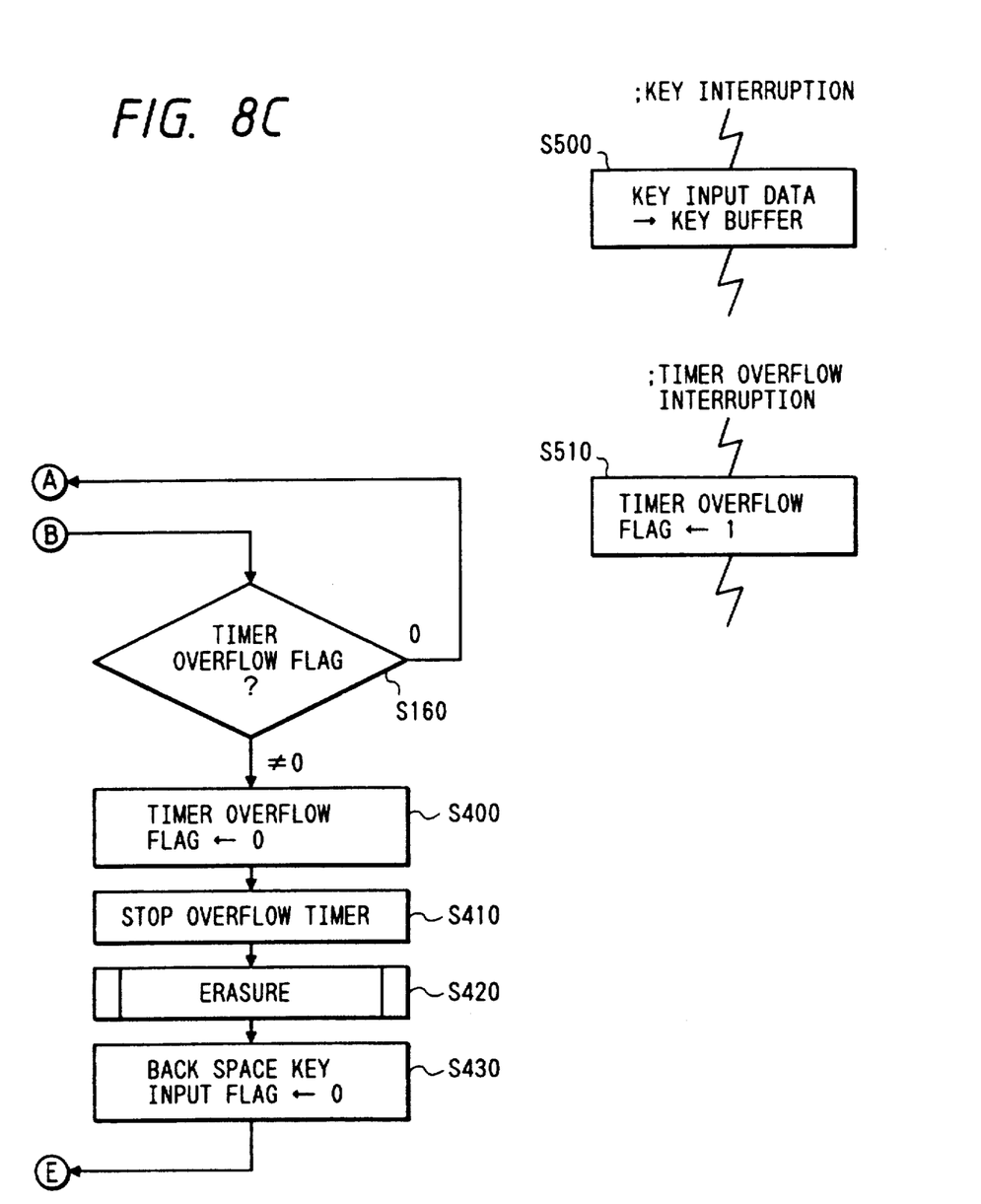

FIG. 8 is a flowchart for the embodiment 3 of the invention. In the embodiment, in response to the continuous input of the erasure key, if the end-of-word data is recognized, the preceding word can be further continuously erased.

As the initialization upon power ON, in step S112, the back space key input flag is reset to "0".

Back space key input

When the back space key is input from the keyboard 5, the key interruption occurs. In step S500, the key input data is stored into the key buffer 7D.

If the key input data exists in the key buffer 7D in the discrimination in step S120, step S130 follows. Since it is determined in step S130 that the input key data is not the erasure key data, the processing routine advances to step S131. Since it is decided that the key input data is the back space key data in step S131, step S250 follows.

If the count value of the erasure key input counter is not "0" (indicative of the continuous input of the erasure key) in step S250 and the like buffer pointer indicates the end-of-line data such as a space or the like (the erasure command of the erasure key for one word has already been generated) in step S260, step S270 follows. If NO in each of steps S250 and S260, the processing routine advances to step S280.

In step S270, the back space key input flag is set to "1" and the processing routine is returned to step S120. In step S280, the back space process is executed and step S120 then follows.

Erasure key input

When the erasure key is input from the keyboard 5, the key interruption occurs and the key input data is stored into the key buffer 7D in step S500.

If the key input data exists in the key buffer 7D in the discrimination in step S120, step S130 follows. Since it is determined in step S130 that the key input data is the erasure key data, step S135 follows. In step S135, if the line buffer pointer indicates data other than the end-of-word data such as a space or the like, step S200 follows.

If the line buffer pointer indicates the end-of-word data such as a space or the like, step S136 follows. If the back space key input flag has been set to "1" in step S136, this state is regarded as the continuation of the erasure command for the preceding word after the erasing operation of one word has already been commanded. In step S138, the back space key input flag is reset to "0". Then, step S200 follows. If the back space key input flag has been reset to "0" in step S136, a buzzer is energized in step S137 to inform that the erasing operation of one word has already been commanded. Then, the processing routine is returned to step S120.

The processes in steps S200 to S230 are the same as in the processing procedure in the embodiment 2.

Erasure

After completion of the erasing processes in steps S300 and S420, the back space key input flag 7G is reset to "0" in steps S301 and S430.

Embodiment 4

Interruption of the continuous erasure

Figure 9:
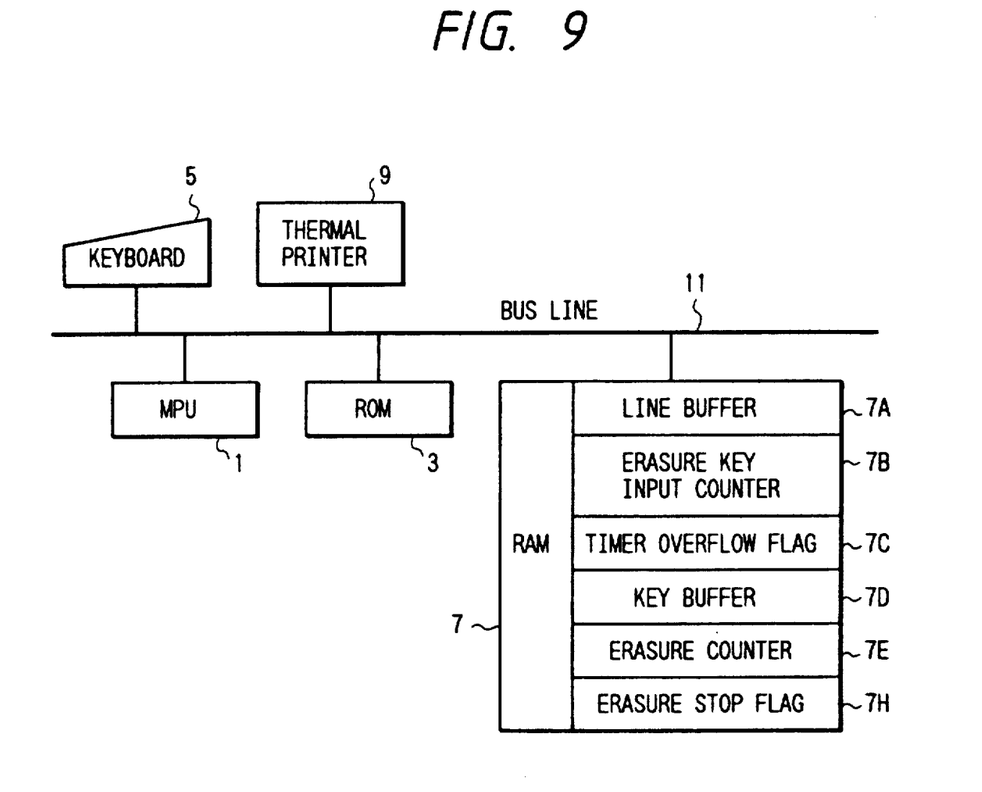
FIG. 9 is a block diagram showing a construction of the embodiment 4 of the invention.

FIG. 9 shows a construction of the embodiment 4 of the invention. The difference between FIG. 9 of the embodiment 4 and FIGS. 2 to 4 used for explanation of the embodiment 1 will now be mainly described hereinbelow.

In FIG. 9, the same parts and components as those shown in FIG. 2 are designated by the same reference numerals.

Reference numeral 7H denotes an erasure stop flag which is set to "1" by the input of a special key (key indicative of the stop of the erasing operation) during the erasing operation. The special key may be a stop key, a cancel key, a space key, or the like. On the other hand, the erasing operation may be either interrupted or stopped.

Figure 10A:
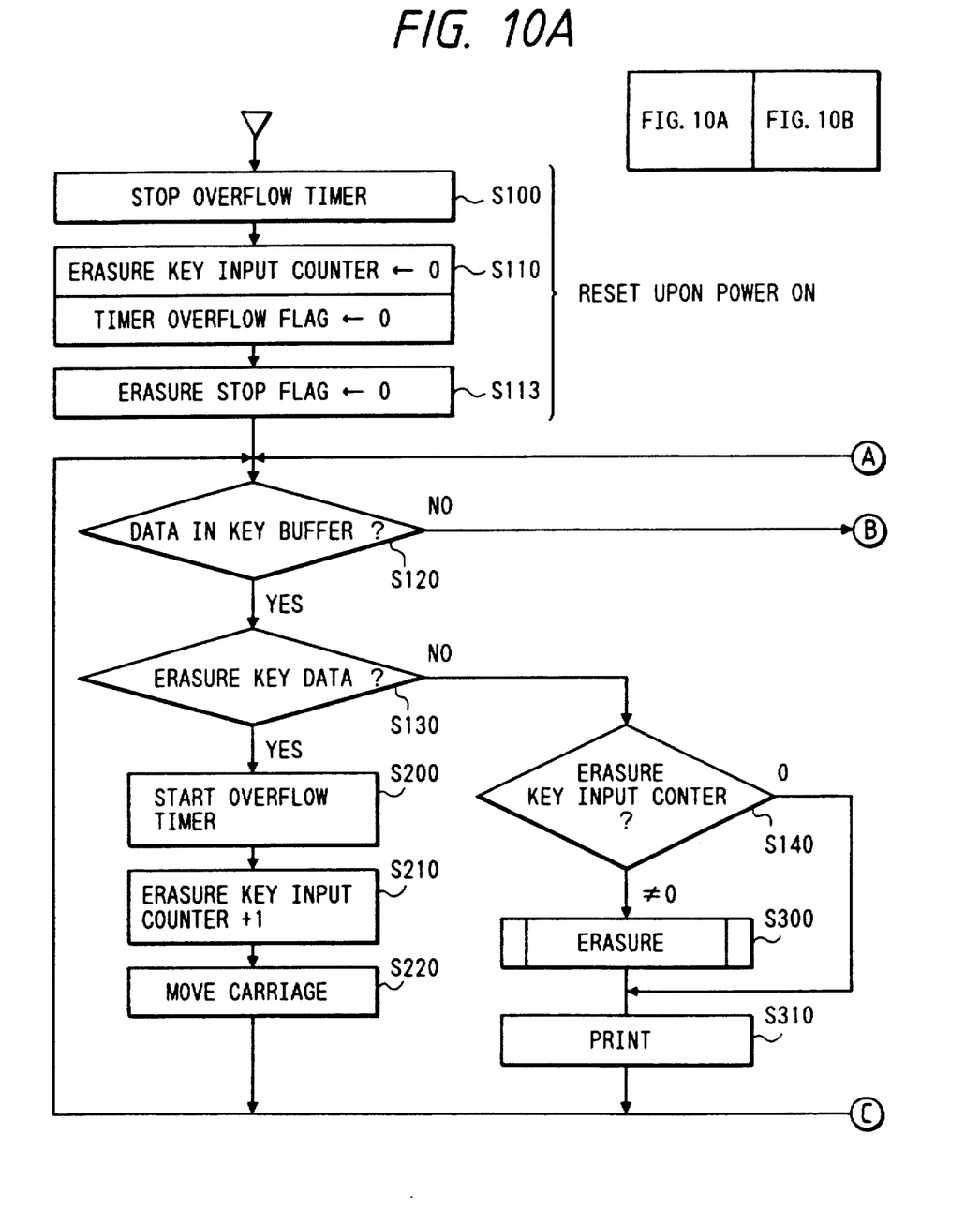
FIGS. 10A & 10B are flowcharts for the embodiment 4 of the invention.
Figure 10B:
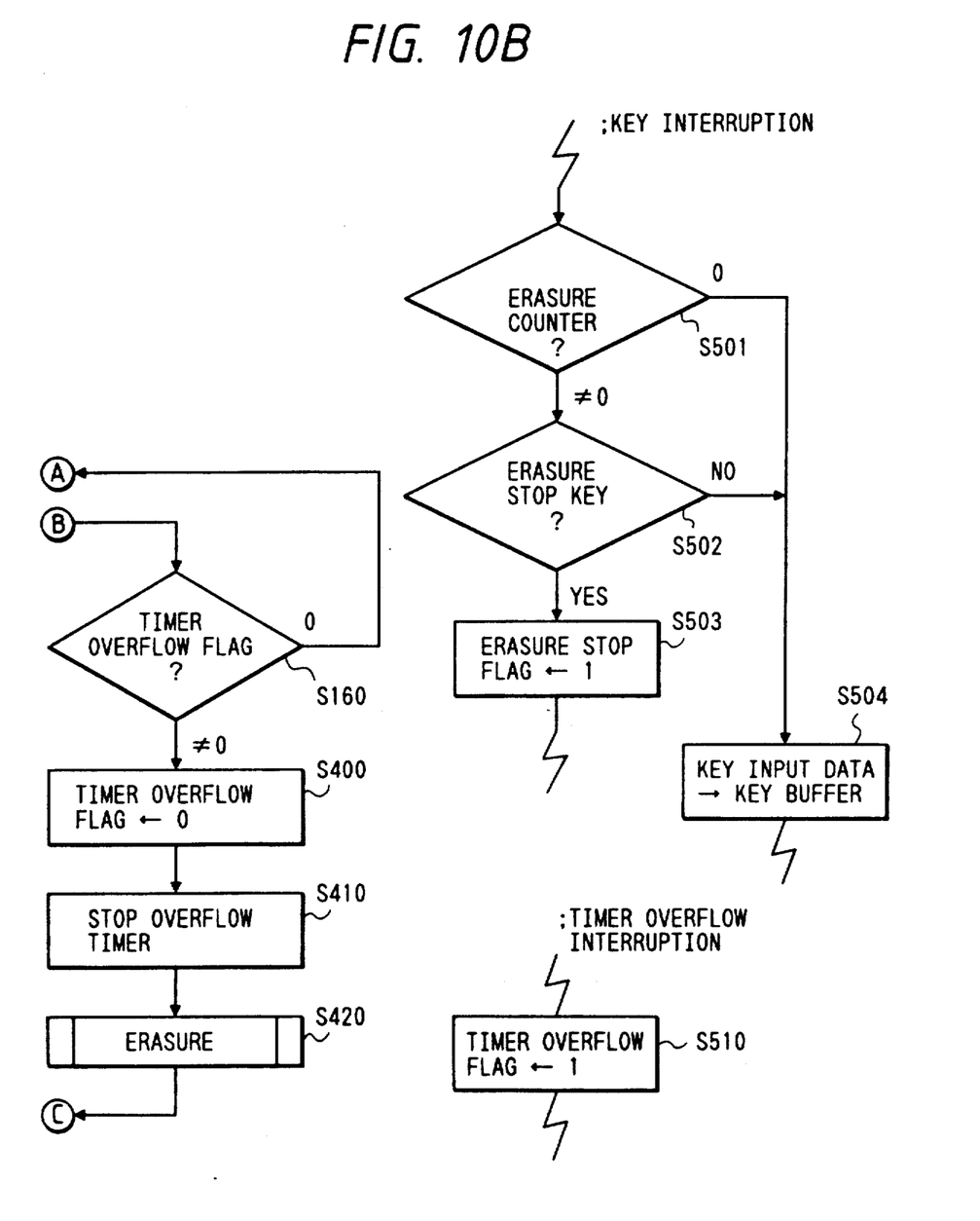

FIG. 10 is a flowchart for the embodiment 4 of the invention. In the embodiment, the erasing operation can be stopped by an erasure stop key during the continuous erasing operation in response to the continuous input of the erasure key.

As the initialization upon power ON, the erasure stop flag is reset to "0" in step S113.

Erasing operation stop key

When the erasing operation stop key is input from the keyboard 5, the key interruption occurs. If the count value of the erasure counter is not "0" (during the erasing operation) in step S501 and the erasure stop key has been input in step S502, the erasure stop flag 7F is set to "1" in step S503. If NO in any of steps S501 and S502, the key input data is stored into the key buffer in step S500.

Erasing process

Figure 11:
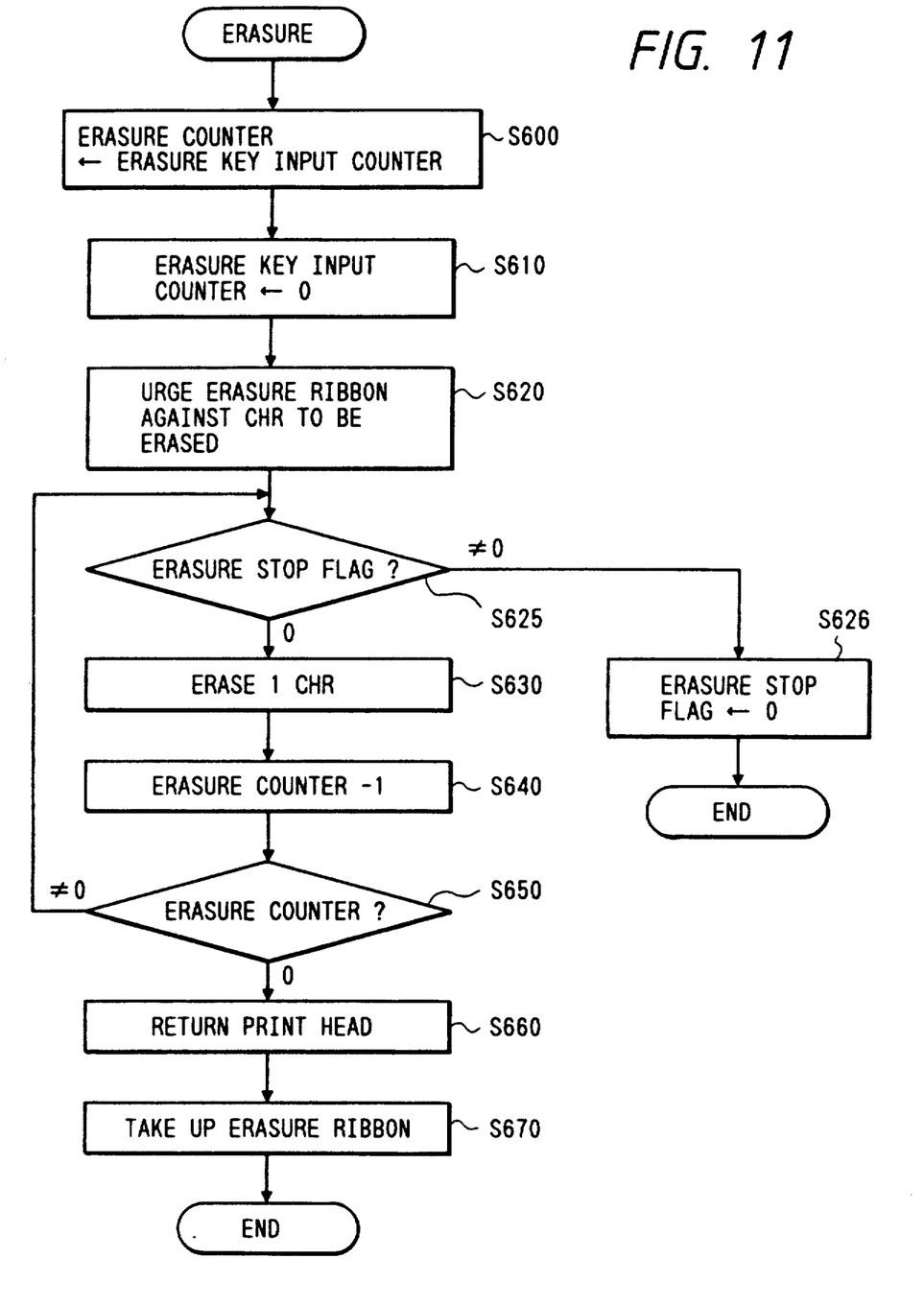
FIG. 11 is a flowchart for the erasing process in the embodiment 4 of the invention.

If the erasure stop flag has been set in step S625 before one character is erased in step S630, the erasing operation is immediately stopped. The erasure stop flag is reset to "0" in step S626 and the processing routine is finished.

As described above, according to the invention, since the characters or the like are erased in correspondence to the continuous erasure input, the erasing operation can be promptly executed. There are advantages such that an amount of ribbon which is consumed for the erasure in the printer can be reduced and the erasing speed is improved.

I claim:

1. A document processing system comprising:
   instruction means for instructing, by entry,
   erasing means for erasing a printed character;
   counter means for counting a first number of entries of said instruction means; and
   control means for controlling said erasing means to erase a second number of printed characters, said second number being equal to said first number of entries counted by said counter means.

2. A system according to claim 1, further comprising:
   timer means for measuring an interval between two successive entries of said instruction means; and
   second control means for controlling said erasing means to start its erasing operation when the measured interval reaches a predetermined value.

3. A system according to claim 2, further comprising:
   second timer means for measuring a time duration during which said instruction means is continuously activated; and
   updating means for updating said first number of entries counted by said counter means in response to the time duration measured by said timer means.

4. A system according to claim 3, wherein said instruction means includes a key for instructing the erasure and a key for repetitive inputs of another key.

5. A document processing system comprising:
   input means for inputting a word and end data which indicates an end of the word;
   memory means for storing the word and the end data input by said input means;
   printing means for printing the word input by said input means;
   instruction means for instructing erasure of a character;
   erasing means for erasing a printed character; and
   control means for controlling said erasing means to stop its erasing operation at the end of a word by referring to data stored in said memory means when said instruction means instructs erasure of successive printed characters.

6. A document processing system comprising:
   input means for inputting a word and end data which indicates an end of the word;
   memory means for storing the word and the end data input by said input means;
   printing means for printing the word input by said input means;
   instruction means for instructing, by entry, erasure of a character;
   erasing means for erasing a printed character;
   counting means for counting a first number of entries of said instruction means;
   first control means for controlling said erasing means to erase a second number of printed characters, said second number being equal to said first number of entries counted by said counter means; and
   second control means for controlling said erasing means to stop its erasing operation at the end of a word by referring to data stored in said memory means.

7. A system according to claim 6, further comprising:
   timer means for measuring a time duration during which said instruction means is continuously activated; and
   updating means for updating said first number of entries counted by said counter means in response to the time duration measured by said timer means.

8. A document processing system comprising:
   erasing means for erasing a printed character;
   first instruction means for instructing erasure of successive characters;
   first control means for controlling said erasing means to erase successive printed characters in response to an instruction by said first instruction means;
   second instruction means for instructing stop of an erasing operation of said erasing means; and
   second control means for controlling said erasing means to stop its erasing operation in response to an instruction by said second instruction means.

* * * * *

UNITED STATES PATENT AND TRADEMARK OFFICE
CERTIFICATE OF CORRECTION

PATENT NO. : 5,010,496
DATED : April 23, 1991
INVENTOR(S) : NOBUO SHIBAZAKI

It is certified that error appears in the above-identified patent and that said Letters Patent is hereby corrected as shown below:

SHEET 2 OF 14

FIG. 3A, "CONTER" (second occurence) should read --COUNTER--.

SHEET 12 OF 14

FIG. 10A, "CONTER" (second occurrence) should read --COUNTER--.

COLUMN 4

Line 8, "in" (first occurrence) should read --of--.
    Line 17, "be" (second occurrence) should be deleted.

COLUMN 7

Line 42, "entry," should read --entry, erasure of a character;--.

Signed and Sealed this

Fifteenth Day of September, 1992

Attest:

DOUGLAS B. COMER

Attesting Officer     Acting Commissioner of Patents and Trademarks